M. Hart,
Sawing Shingles.
No. 102,396.          Patented Apr. 26, 1870.

Witnesses          Inventor
F. Lehmann.       Matthew Hart
C. L. Evers       per Alexander & Mason
                          Attys

UNITED STATES PATENT OFFICE.

MATTHEW HART, OF BOSTON, MICHIGAN.

IMPROVEMENT IN MACHINES FOR SAWING SHINGLE-BOLTS.

Specification forming part of Letters Patent No. 102,396, dated April 26, 1870; antedated April 23, 1870.

*To all whom it may concern:*

Be it known that I, MATTHEW HART, of Boston, in the county of Ionia, and in the State of Michigan, have invented certain new and useful Improvements in Machines for Fitting Shingle-Bolts; and I do hereby declare that the following is a full, clear, and exact description thereof, reference being had to the accompanying drawings, and to the letters of reference marked thereon, making a part of this specification.

The nature of my invention consists in the construction and general arrangement of a "machine for fitting shingle-bolts," by the use of which a great deal of timber and labor is saved, and a greater amount of shingles can be sawed by the shingle-machine from bolts fitted by this machine than from bolts made by splitting and sapping by hand, as is now usually the case.

In order to enable others skilled in the art to which my invention appertains to make and use the same, I will now proceed to describe its construction and operation, referring to the annexed drawings, in which—

Figure 1:
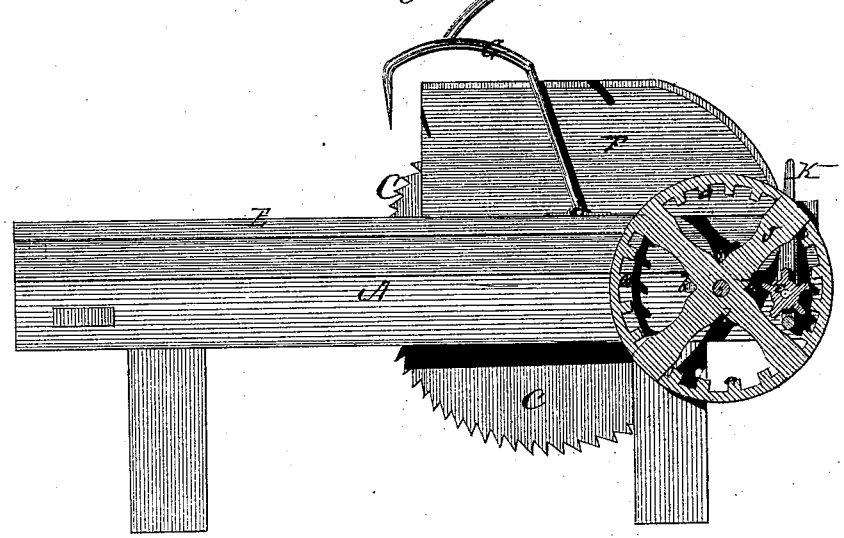
Figure 2:
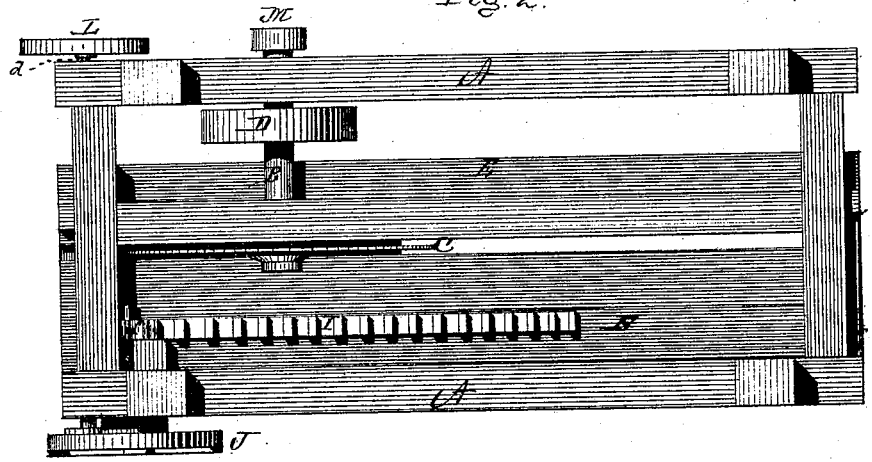

Figure 1 is a side elevation, and Fig. 2 a bottom view, of my machine.

A represents the frame of my machine, at a suitable point on which, in proper journal-boxes, is placed the shaft B, having at its inner end, within the frame, a circular or drag saw, C. The shaft B and saw C receive their motion from any desired engine, connected with said shaft by means of a belt passing around the wheel D on the same. A slotted saw-table, E, is placed on the frame A, the saw C passing through the slot in the same.

On the upper side of the table E, at one end, is a raised cap, F, which covers or protects the saw while shifting the bolt. The bolt is held on the table by means of the double dog G, which is pivoted to the table and provided with a lever or handle, H, so that the dogs can be raised away from the bolt when desired to shift the same. The table E is moved to either end in the following manner and by the following means: On its under side is placed a rack-bar, I, which gears with a small pinion, $f$, on the inner end of a shaft which has its bearings in or near the side of the frame A, and is at its outer end provided with a double-gear wheel, J. The gear-wheel J has two sets of cogs—one set, $a\ a$, on the inner side of its outer rim, and the other set, $b\ b$, on the outside of its hub. At the same end of the frame A, but on the opposite side from the gear-wheel J, is placed a bearing for a shaft, $d$, which runs across the frame A, and has its other bearing in a lever, K, pivoted to the same side of the frame that the gear-wheel is on, and in such a position that this end of the shaft $d$ will be between the two sets of cogs of said wheel.

The shaft $d$ is, at the end of its stationary bearing, provided with a pulley or wheel, L, which, by means of a belt, is connected with a small pulley, M, on the outer end of the shaft B, and thus the necessary rotary motion is communicated to the shaft $d$. On the end of said shaft which passes through the lever K is a small pinion, $e$, which, by the motion of the lever from one side to the other, is made to gear with either set of cogs in the gear-wheel J, and consequently the table be made to move to or from the saw, so as to feed the bolt to the saw or move it from the saw at pleasure; or the pinion $e$ can be held between the said sets of cogs, so as not to gear with either, and consequently the table remain stationary.

Having thus fully described my invention, what I claim as new, and desire to secure by Letters Patent, is—

The movable saw-table E, provided with cap or covering F, double dog G, lever H, and rack-bar I, all substantially as and for the purposes herein set forth.

In testimony that I claim the foregoing I have hereunto set my hand this 25th day of August, 1869.

MATTHEW HART.

Witnesses:
THOMAS J. SLAYTON,
SAMUEL HARTT.